United States Patent [19]

Fasullo et al.

[11] Patent Number: 5,690,448
[45] Date of Patent: Nov. 25, 1997

[54] LANDFILL CLOSURE SYSTEM

[75] Inventors: Leonard Joseph Fasullo, Wilmington; Brian Joseph Strusowski, Bear; Michael U. Destefano, Wilmington; David Giacomini; Michael Joseph Lukas, both of Newark, all of Del.

[73] Assignee: E. I. du Pont de Nemours and Company, Wilmington, Del.

[21] Appl. No.: 787,999

[22] Filed: Jan. 24, 1997

Related U.S. Application Data

[63] Continuation of Ser. No. 327,257, Oct. 21, 1994, abandoned.
[51] Int. Cl.⁶ .......................................... B09B 1/00
[52] U.S. Cl. ...................... 405/129; 405/128; 106/697
[58] Field of Search .................. 405/129, 128, 405/263, 264; 166/697, 900

[56] References Cited

U.S. PATENT DOCUMENTS

| | | | |
|---|---|---|---|
| 4,655,839 | 4/1987 | Chao et al. | 405/129 X |
| 4,840,671 | 6/1989 | Lynn et al. | 106/85 |
| 4,844,840 | 7/1989 | Feizollahi | 405/129 X |
| 4,911,757 | 3/1990 | Lynn et al. | 106/85 |
| 5,054,962 | 10/1991 | Bahnmuller et al. | 405/129 |
| 5,090,843 | 2/1992 | Grigsby | 405/129 |
| 5,133,991 | 7/1992 | Norman et al. | 427/136 |
| 5,141,362 | 8/1992 | Kugler | 405/263 |
| 5,190,406 | 3/1993 | Shannonhouse et al. | 405/129 |
| 5,249,889 | 10/1993 | Sierzega | 405/128 |
| 5,259,697 | 11/1993 | Allen et al. | 405/129 |
| 5,320,450 | 6/1994 | Smith | 405/129 |
| 5,374,139 | 12/1994 | Kugler | 405/129 |
| 5,518,633 | 5/1996 | Brown et al. | 210/713 |

OTHER PUBLICATIONS

Technical Guidance Document: Final Covers on Hazardous Waste Landfills and Surface Impoundments, U.S. Environmental Protection Agency, EPA 530–SW–89–047, Jul. 1989.

*Primary Examiner*—Tamara L. Graysay
*Assistant Examiner*—Frederick L. Lagman
*Attorney, Agent, or Firm*—Daniel W. Sullivan

[57] ABSTRACT

A landfill closure system comprising (a) a vegetated top layer comprising an effective among of an iron containing solids component; (b) a drainage layer; and (c) a low-permeability layer is disclosed.

7 Claims, No Drawings

LANDFILL CLOSURE SYSTEM

This is a continuation of application Ser. No. 08/327,257 filed Oct. 21, 1994, now abandoned.

BACKGROUND OF THE INVENTION

This invention relates to a landfill closure system comprising (a) a vegetated top layer comprising an effective amount of an iron-containing solids component; (b) a drainage layer; and (c) a low-permeability layer.

Large amounts of metal chlorides arise as by-products from various industrial processes. For example, in a chloride process for making $TiO_2$, titanium bearing material or ore is chlorinated to produce $TiCl_4$ and other metal chloride by-products. The metal chloride by-products are highly acidic and often contain iron chlorides as a major ingredient. Many processes to treat these materials are expensive and produce a product that must still be disposed of by neutralization, landfilling, deepwelling or other disposal methods. The need therefore exists for treating aqueous media containing metal ions that produces saleable products.

Further, the United States Environmental Protection Agency (EPA) and various State Departments guide and regulate industrial landfills and more particularly landfill closure. Interchangeability of terms used herein are "landfill closure system", "landfill cap or capping system" and "final covers on landfills". A landfill closure should (1) provide long-term minimization of migration of liquids though the closed landfill; (2) function with minimal maintenance; (3) promote drainage and minimize erosion or abrasion of the final cover; (4) accommodate settling and subsidence to maintain integrity of the final cover; and (5) have a permeability less than or equal to the permeability of a bottom liner system or natural subsoils present.

Concomitantly, there is need to develop a compact landfill closure system which meets Federal/State standards, results in compatibility of materials and is cost-effective.

The present invention meets these needs.

SUMMARY OF THE INVENTION

In accordance with this invention there is provided a landfill closure system comprising:

(a) a vegetated top layer comprising an effective amount of an iron containing solids component;

(b) a drainage layer; and (c) a low-permeability layer.

It has been found that the present invention makes use of by-products from various industrial processes which might otherwise be considered waste materials. The present invention meets EPA and State of Delaware standards. The use of a geosynthetic material, which replace natural soil, and the iron component allows for a more compact cap and compatible design resulting in advantages in cost, labor, material and material performance. Yet another advantage of the iron component is that it is believed to remove or treat toxic substances that may be present in the soil, a function not available in conventional topsoil materials.

DETAILED DESCRIPTION

Iron Containing Solids Component

The iron-containing solids component is derived from titanium bearing material or ores which contain iron and other constituents and originates from an aqueous media by-product stream containing metal ions. Several current industrial processes produce by-product streams which are comprised of metal chlorides, salts and other materials in aqueous solution or suspension and include, but are not limited thereto, the chloride process for making titanium dioxide (as described in greater detail in U.S. Pat. No. 2,488,439 and U.S. Pat. No. 2,488,440, the teachings of which are incorporated herein by reference), cleaning processes of iron, steel or other metals.

The iron content in the iron component, expressed as elemental iron on a dry weight basis, will depend on the ore selected and the method of obtaining the iron component. Typically, the iron content is about 6% to about 57%, preferably about 6% to about 50%. More preferably, the iron content will be about 6% to about 31% produced from a lime precipitation process during a wastewater treatment; and about 31% to about 38% produced from a lime precipitation process after chlorination of a titanium bearing material or ore; and about 22% to about 57%, preferably about 25% to about 33%, produced from a carbonate precipitation process.

There are three methods for preparing or obtaining the iron component. For example, in a U.S. Pat. No. 5,518,633 (Cary V. Brown, et al.), also referred herein as a carbonate precipitation process, the teachings of which are incorporated herein by reference, the aqueous media are treated by:

(1) contacting the aqueous media, at a pH of about 1–5 with an effective amount of product recycled from step (2) to dissolve at least some metal carbonates, produce at least some $CO_2$, convert at least some metal ions having a valence of at least +3 to metal hydroxide precipitates, and neutralize some acid, if present;

(2) contacting the product of step (1), at a pH of about 4–8.5, with an effective amount of $Na_2CO_3$ to convert at least some metal ions of +2 valence to metal carbonate precipitates and form at least some dissolved sodium salts;

(3) recovering, from a portion of the product from step (2) that is not recycled, metal carbonates, metal hydroxides and sodium salts.

A number of different alkaline materials, in addition to the carbonates, can be used to precipitate the metal carbonates, metal hydroxides or both, and include but not limited thereto, lime, alkali and alkaline earth metal oxides, hydroxides and mixtures thereof.

A preferred embodiment of recovering precipitates comprising metal hydroxide and metal hydrated oxide is from a process of treating aqueous media containing metal ions with a hydrated time $(Ca(OH)_2)$ slurry at a pH of about 7–10, typically about 8.5–9.5, to produce $CaCl_2$, metal hydroxides and metal hydrated oxides. This preferred method can be done in two ways and constitutes the second and third method for preparing the iron component. First, the above treated metal ions comprising iron hydrated oxides and iron hydroxides are further treated with a polymer that aids in settling and is typically a high molecular weight polymer, and then settled in clarifers. This process is referred herein as a lime precipitation process during a wastewater treatment, and produces a low concentration iron component. Second, an aqueous media comprising metal ions may be subjected to a separating operation to remove coke and ore solids after chlorination of titanium-bearing material or ore, and the aqueous media comprising metal ions is then treated in an one stage neutralizer with a hydrated lime as described above resulting in metal hydroxides and metal hydrated oxides being formed. This second process is referred herein as a lime precipitation process after chlorination of titanium bearing materials or ores and produces a high concentration iron component.

Metal carbonates, metal hydrated oxides, metal hydroxides or mixtures thereof can be recovered by precipitating the by-product stream using alkaline material including, but not limited thereto, lime, alkali and alkaline earth metal oxides, hydroxides, and carbonates and mixtures thereof as described above. Thereafter, the mixture of metal hydroxides and metal hydrated oxides, or mixture of metal hydroxides and metal carbonates will be suspended in either $CaCl_2$ and $H_2O$ or NaCl and $H_2O$, respectively.

The precipitates from all three processes may be further subjected to dewatering. Any type of standard liquid/solid separation technique is contemplated. For example, a centrifuge, gravity settler, vacuum filter, plate and frame filter with membrane press or the like is applicable with a centrifuge being preferred when carbonate precipitated procedure is used and a plate and frame filter with membrane presses being preferred when either of the lime precipitated procedure is used. When the dewatering is conducted with a centrifuge, a two-step separation is preferred. For example, the precipitates are centrifuged from about 1600 to 2000 G in about 5 seconds to 2 minutes to bring the solids content to about 30 to about 70%, preferably about 40 to about 65%. Next, the precipitates are repulped with water for washing to lower the salt content. Finally, the precipitates are centrifuged to bring the solids content to about 30 to about 70%, preferably about 40 to about 65%. Alternatively, in either of the lime precipitated procedure, the treated slurry is filtered with the plate and frame filter with membrane presses where the $CaCl_2$ and water are separated from the metal hydroxide and metal oxide precipitates. The solids content ranges from about 35 to about 60%, preferably from about 50%–60%.

Next is an optional drying step so that the solids content ranges from about 70 to about 100%, preferably about 75 to about 85%. Any type of drying method is contemplated, for example, a rotary dryer or the like may be used. Drying under ambient conditions is preferred for either of the lime precipitation processes.

A further optional step is reducing the particle size of the solid by crushing or the like.

Landfill Closure System incorporating the Iron Component (a) A Vegetated Top Layer The topmost portion of the vegetated top layer comprises vegetation, which can be grass or other low-growing plants suitable to the local climate, resistant to drought and temperature extremes and requiring insubstantial maintenance. The remaining portion of the vegetated top layer comprises two-tiers: (i) a topsoil layer comprising a mixture of an effective amount of an iron containing solids component, and a compost; and (ii) a subsoil layer. The iron component is obtained as described above from any of the three methods, or is commercially available. It is particularly preferred to use a low concentration iron component containing about 6% to about 31% expressed as iron on a dry weight basis in the topsoil. It will be appreciated by those skilled in the art that a high concentration iron component or a high concentration iron component obtained from the carbonate process may be used if it is subjected to a washing step to remove additional calcium or sodium chlorides present. The compost can be leaf compost, or other compost materials or combinations thereof as long as no substantial amounts of heavy metals are present. The compost provides nutrient levels necessity to sustain the vegetation. Typically, the minimum depth of this topsoil layer is 6 inches (about 15 cm). The purpose of this topsoil layer is to provide and support vegetation, to assure adequate rooting and moisture retention. In carrying out the invention, the ratio of the mixture can range from about 10% of the iron component and about 90% compost to about 90% of the iron component and about 10% compost, preferably the mixture can range from about 30% iron component:70% compost to about 70% iron component:30% compost, more preferably the mixture can range from about 40% iron component:60% compost to about 60% iron component:40% compost and most preferably the mixture can be about 50% iron component:50% compost.

The subsoil layer of the vegetated top layer provides a minimum depth of about 18 inches (about 45 cm). Anything that prevents burrowing animals from damaging the underlying layers and to provide rooting depth and moisture for plant growth can be used to carry out the invention such as a Select Fill Type C soil classification by the Department of Transportation. Preferred is the iron component and particularly preferred is a high concentration, such as about 31% to about 38% expressed as iron on a dry weight basis in the subsoil layer. Contemplated equivalents include a low concentration iron component or the iron component obtained by the carbonate process.

Next, a geotextile filter is an optional layer between the vegetated layer and a drainage layer. Geotextile filter prevents soil fines from reaching a drainage layer. Geotextiles are relatively high permeability materials which allow the movement of liquid through while preventing the movement of soil particles. The geotextile is selected based on the soil properties, for which it acts as filter, including permeability of the subsoil and percentage of fines in the soil, and can be made of polypropylene, polyester, polyamide, polyethylene or the like. In general, geosynthetic materials such as geotextiles, geomembranes, geogrids, and geonets are described in greater detail in G. N. Richardson and R. M. Koerner, *Geosynthetic Design Guidance for Hazardous Waste Landfill Cells and Surface Impoundments*, U.S. Environmental Protection Agency (1987), the teachings of which are incorporated herein by reference. Geosynthetic materials provide certain hydraulic functions. Geomembranes limit the movement of leachate in the system and are impermeable synthetic liners used to control fluid migration. Geotextiles act as a filter to prevent the flow of soil fines into drainage systems, provides planar flow for drainage or as a cushion to protect geomembranes. Geotextiles are fabrics constructed of fibers of synthetic materials and intended for engineering applications within soils such as polymer, fiber and fabric style used in its construction. Geonets and nonwoven geotextiles allow planar flow of liquids and serve as drainage systems.

(b) A Drainage Layer

This drainage layer can be comprised of geosynthetic materials in the form of a geogrid or geonet, sand, soil, any of the iron components described above, rock, stone or the like as long as there is capacity to transmit water. The purpose of this layer is to facilitate the rapid and efficient removal of water which infiltrates through the top layer to an exit drain in order to minimize the amount and residence time of water coming into contact with the low permeability layer, thereby decreasing the potential for leachate generation. The drainage layer should slope to an exit drain to allow for the water to be efficiently removed.

The drainage layer can be preferably comprised of geosynthetic materials such as geogrids or geonets that have the same performance characteristics compared to sand in terms of hydraulic conductivity and transmissivity. Geogrids are formed by punching a regular pattern of holes into sheeting and then drawing the sheeting uniaxially or biaxially. Typically, a size opening would range from about ½ inches to about ¾ inches (about 1 cm to about 2 cm). Geonets are extruded nets formed by extruding or bonding of up to three layers of polymer rods oriented at acute angles to each other. Geonets are preferred in this invention to form the leachate or surface water collection/removal system.

Geogrids and geonets can be based on extruded polypropylene or polyethylene. When a geosynthetic drainage layer is used, it is important to include a geosynthetic filter layer above the drainage layer to prevent intrusion and clogging by the overlying top layer soil material.

(c) A Low-Permeability Layer

The low-permeability layer can be comprised of a geomembrane liner which is optionally underlain by a geotextile filter or an additional iron component layer. The purpose of this low permeability layer is to maximize removal of water by the overlying drainage layer and to minimize infiltration of water into the waste and to provide a firm foundation for the overlying layers of the landfill capping system. The low permeability layer should be located below the maximum depth of frost penetration. This requirement, however, is not critical to the invention.

The low permeability layer can be comprised of a geomembrane with a minimum of about 20 mil (0.5 mm) thickness. Geomembranes are impermeable synthetic liners that can be used to control fluid migration. The permeability of geomembranes can be a minimum of $10^{-7}$ cm/sec and is typically about $10^{-14}$ to about $10^{-13}$ cm/sec. Geomembranes for use as low permeability layers can be comprised of linear or slightly branched polymers, most commonly high density polyethylene, polyvinyl chloride, chlorosulfonated polyethylene or the like. Typical additives to the polymers can include, but are not limited to plasticizers, UV light protection agents, antioxidants and fungicides.

Contemplated equivalents to the geomembrane liner is about 2 feet (about 61 cm) of clay or the like. It has been found that sodium bentonite, which is a common substitution for the geomembrane liner, is not a compatible equivalent.

Finally above the waste layer can be an optional geotextile or additional iron component layer from any of the three processes, providing a minimum thickness of about 6 inches (about 15 cm), which serves to separate the waste from the low permeability layer or geomembrane liner. The geotextile protects or cushions the geomembrane liner from punctures, stress, and abrasion. As described above, the geotextiles can be made of polypropylene, polyester, polyamide, polyethylene or the like. The geotextile is selected based on the properties of the waste from which it separates the geomembrane layer.

The following Examples are construed as illustrative and not limitative of the remainder of the disclosure in any way whatsoever.

EXAMPLE

This is a summary of the landfill closure system engineered in the following Example:
waste material;
a geotextile filter layer;
a geomembrane low permeability layer;
geogrid drainage net;
geotextile filter layer;
subsoil comprising iron component and topsoil comprising a mixture of iron component and compost; and
vegetation.

A detailed example follows. Above the waste material in a landfill was placed a polypropylene, nonwoven, continuous filament, needlepunched chemically UV stabilized geotextile, Polyfelt TS 700 (available from Polyfelt, Inc., Atlanta, Ga.), 6 ounces per square foot (0.18 g per square cm) which serves to separate and protect the low permeability layer or liner (geomembrane) from the waste.

Above the geotextile protective layer was placed a high density polyethylene geomembrane, Poly-Flex polyethylene geomembrane (available from Poly-Flex, Inc., Grand Prairie, Tex.), 40 mil (1 mm) thick, with a moisture vapor transmission rate of 0.025 g/100 in 2/day (as determined by ASTM E 96 at 100° F. at 100% relative humidity).

Above the geomembrane layer was placed a geonet of two overlapping polyethylene strands, Gundnet XL-14 (available from Gundle Lining Systems, Inc., Houston, Tex.) with a minimum thickness of 0.200 to 0.265 inches (0.51 cm to 0.67 cm) and a minimum transmissivity of $2 \times 10^{-3}$ m²/sec (as determined by ASTM D4716 at 10,000 psf compressive load between two layers of Gundline HD; 0.25 gradient).

Above the geonet was placed a second geotextile protective layer of a polypropylene, nonwoven, continuous filament, needlepunched chemically UV stabilized geotextile, Polyfelt TS 700 (available from Polyfelt, Inc., Atlanta, Ga.), 8 ounces per square foot (0.24 g per square cm) which serves to prevent soil fines from getting to the geonet.

Above the second geotextile layer was placed an 18 inch (about 45 cm) subsoil layer of iron containing solids with a high iron concentration, 31 to 38% expressed as iron on a dry weight basis, produced by the precipitation of a metal chloride by-product stream from the chloride process to produce $TiO_2$ by using alkaline materials, iron component from the lime precipitation process after chlorination of titanium bearing ore (available from E. I. du Pont de Nemours and Company, Wilmington, Del.) which provides rooting depth and moisture for plant growth.

Above the subsoil layer was placed a 6 inch (15 cm) layer of a 50:50 mixture of iron containing solids with a low iron concentration, 6% to 31% expressed as iron on a dry weight basis, produced by the precipitation of a metal chloride by-product stream from the chloride process to produce $TiO_2$ by using alkaline materials, iron component from the lime precipitation process during the wastewater treatment (available from E. I. du Pont de Nemours and Company), and leaf compost which provides and supports vegetation, to assure adequate rooting and moisture retention.

Having thus described and exemplified the invention with a certain degree of particularity, it should be appreciated that the following claims are not to be limited but are to be afforded a scope commensurate with the wording of each element of the claims and equivalents thereof.

What is claimed is:
1. A landfill closure system, comprising:
   (a) a vegetated top layer comprising an iron containing solids component, wherein the iron containing solids component is produced from the neutralization of a metal chloride by-product stream;
   (b) a drainage layer; and
   (c) a low-permeability layer comprising a geomembrane liner.
2. The landfill closure system of claim 1, wherein the vegetated top layer comprises, in sequence,

(i) topsoil comprising a mixture of at least one low concentration iron containing solids component such that the concentration of iron in the topsoil is in the range of about 6% to about 31% based on the dry weight of the topsoil; and compost; and (ii) subsoil comprising an iron containing solids component; and wherein the low permeability layer comprises a geomembrane liner comprising a polymeric material selected from the group consisting of high density polyethylene, polyvinyl chloride and chlorosulfonated polyethylene.

3. The landfill closure system of claim 1 wherein the drainage layer is a geosynthetic drainage layer and the landfill closure system further comprises:

(d) a geotextile filter layer between the vegetated top layer and the geosynthetic drainage layer.

4. The landfill closure system of claim 3, further comprising;

(e) a second geotextile filter layer under the geomembrane liner.

5. The landfill closure system of claim 3 further comprising:

(f) an iron component layer under the geomembrane liner.

6. The landfill closure system of claim 2, claim 3, claim 4, or claim 5 wherein the topsoil comprises about 10–90% of at least one iron containing solids component and about 10–90% compost.

7. The landfill closure system of claim 6 wherein the topsoil is about 40% to 60% of at least one low concentration iron containing solids component such that the concentration of iron in the topsoil is in the range of about 6% to about 31% based on the dry weight of the topsoil and 40% to 60% compost.

* * * * *